United States Patent [19]

Brown et al.

[11] Patent Number: 4,599,645

[45] Date of Patent: Jul. 8, 1986

[54] SYSTEM FOR IMAGE GENERATION

[75] Inventors: Raymond E. Brown; Homer E. Dillard, both of St. Louis County; James W. Green, St. Charles County; Stuart A. McIntosh, St Louis County, all of Mo.

[73] Assignee: McDonnell Douglas Corporation, St. Louis, Mo.

[21] Appl. No.: 471,007

[22] Filed: Mar. 1, 1983

[51] Int. Cl.[4] .......................... H04N 7/18; H04N 7/00
[52] U.S. Cl. ..................................... 358/104; 358/102; 358/103; 353/79; 434/37; 434/38; 434/43; 434/44
[58] Field of Search ....................... 358/104, 103, 102; 353/99, 89, 79; 434/37, 38, 43, 44

[56] References Cited

U.S. PATENT DOCUMENTS

| | | | |
|---|---|---|---|
| 3,573,338 | 4/1971 | Davidoff | 358/104 |
| 3,836,812 | 9/1974 | Bennett | 358/104 |
| 4,167,311 | 9/1979 | Pund | 353/99 |
| 4,199,875 | 4/1980 | Barbarasch | 358/104 |
| 4,427,274 | 1/1984 | Pund et al. | 353/99 |

Primary Examiner—Howard W. Britton
Assistant Examiner—John K. Peng
Attorney, Agent, or Firm—Polster, Polster and Lucchesi

[57] ABSTRACT

A system for image generation is provided which includes a device for controlling the sweep voltages of a CRT so that realistic views of the earth can be projected on a curved screen surface from a flat transparency and for generating a haze band between the earth and sky interface of the projected scene. The preferred embodiment is an aircraft flight simulator in which real world scenes are projected and updated in accordance with simulated aircraft maneuvers. Various visual flight cures are or can be presented to an operator during training. These flight cues include a dynamic haze or cloud band along the projection of the earth and sky interface. The system permits image projection with six degrees of freedom (yaw, pitch, roll, altitude, north-/south and east/west vector components) over simulated terrain. In the preferred embodiment, the haze or cloud band generation is accomplished so that it is compatible with a single projector technique.

17 Claims, 7 Drawing Figures

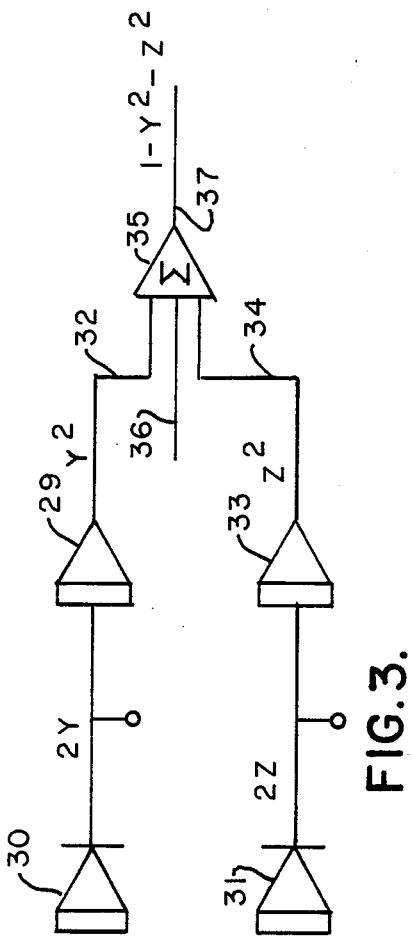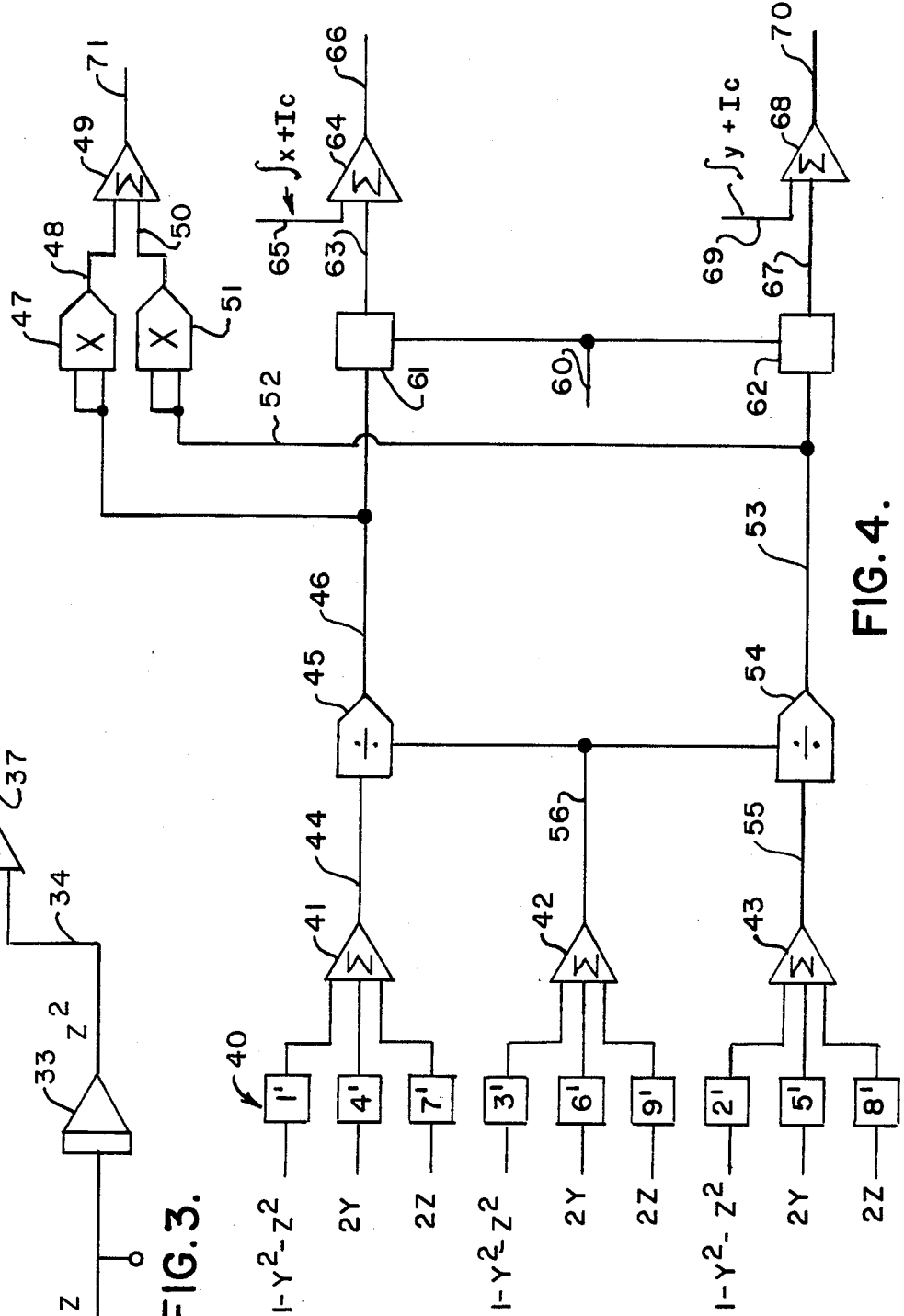

SYSTEM FOR IMAGE GENERATION

BACKGROUND OF THE INVENTION

This invention relates to projection systems, and in particular, to a projection system adaptable for use in flight simulators. While the projection system is described with particular detail in conjunction with its flight simulator application, those skilled in the art will recognize the wider applicability of the inventive principles disclosed hereinafter.

The art of flight simulation has developed to the point where the flight simulators offer sound, motion and visual cues for research, engineering development and pilot training applications that closely approximate actual flight conditions. Among known simulator systems is one in which several projectors are used, including projectors which are behind the display system. More recently, systems have been designed which use two projectors to essentially fill a 360° dome. Art which relates to this simulation technique include (i) the U.S. patents to Pund, U.S. Pat. No. 4,167,311, (ii) U.S. Ser. No. 254,417, filed Apr. 15, 1981, now U.S. Pat. No. 4,427,274 and U.S. Ser. No. 428,169, now U.S. Pat. No. 4,515,450 filed Sept. 29, 1982, all assigned to the assignee of the present invention. The disclosures of each of the patents and applications are incorporated herein by reference. The invention disclosed hereinafter is intended to be compatible with certain aspects of those systems. However, it also provides additional flight cues to the operator of the simulator by generating a dynamic earth/sky interface which changes with altitude, attitude, and horizontal position over the terrain of the simulated flight so that the scene presented to the operator changes dynamically in a realistic manner. The earth/sky and cloud interface is accomplished simply and more economically than known prior art devices.

One of the objects of this invention is to provide an image generation system supplying imagery to a projection system which is capable of projecting an image from a single projector onto an extremely wide field so as to cover a very large display area with imagery, that imagery including a dynamic earth/sky interface.

Another object of this invention is to provide an image generation system which is particularly suitable for use in providing imagery to a projection system for projecting realistic visual scenes for simulated flight.

Another object of this invention is to provide an image generation system which supplies imagery to a projection system in which a dynamic earth/sky interface can be provided at relatively low cost.

Another object of this invention is to provide an earth/sky interface which is dynamically changed in real time with simulated flight movements.

Another object of this invention is to provide an image generation system in which a flat transparency is employed to provide imagery for a projection system for projecting imagery representing the earth surface.

Another object of this invention is to compensate electronically for geometric distortions introduced by a projection system projecting onto a curved surface.

Yet another object of this invention is to provide a system for controlling the sweep voltages of a CRT so as to permit use of a flat transparency for image projection.

Other objects of this invention will be apparent to those skilled in the art in light of the following description and accompanying drawings.

SUMMARY OF THE INVENTION

In accordance with this invention, generally stated, a system is provided which enables projection of an image on a projection area. The image projected is obtained from a flat transparency and a control device is provided for properly correlating the image obtained from the flat transparency and image projected to give proper perspective to the projected image. That projected image also is correlated with a haze generating device to produce an earth, sky, and haze band which can be altered in real time to correspond to actions taken by an observer. Preferably, the system is employed in a flight simulator and the earth, sky, and haze band is altered to correspond to simulated actions of an aircraft.

BRIEF DESCRIPTION OF THE DRAWINGS

In the drawings,

FIG. 3 is a block diagrammatic view of a device for developing control information for the system of FIG. 1;

FIG. 4 is a block diagrammatic view of a device for developing sweep voltages for the system of FIG. 1;

DESCRIPTION OF THE PREFERRED EMBODIMENT

Figure 1:
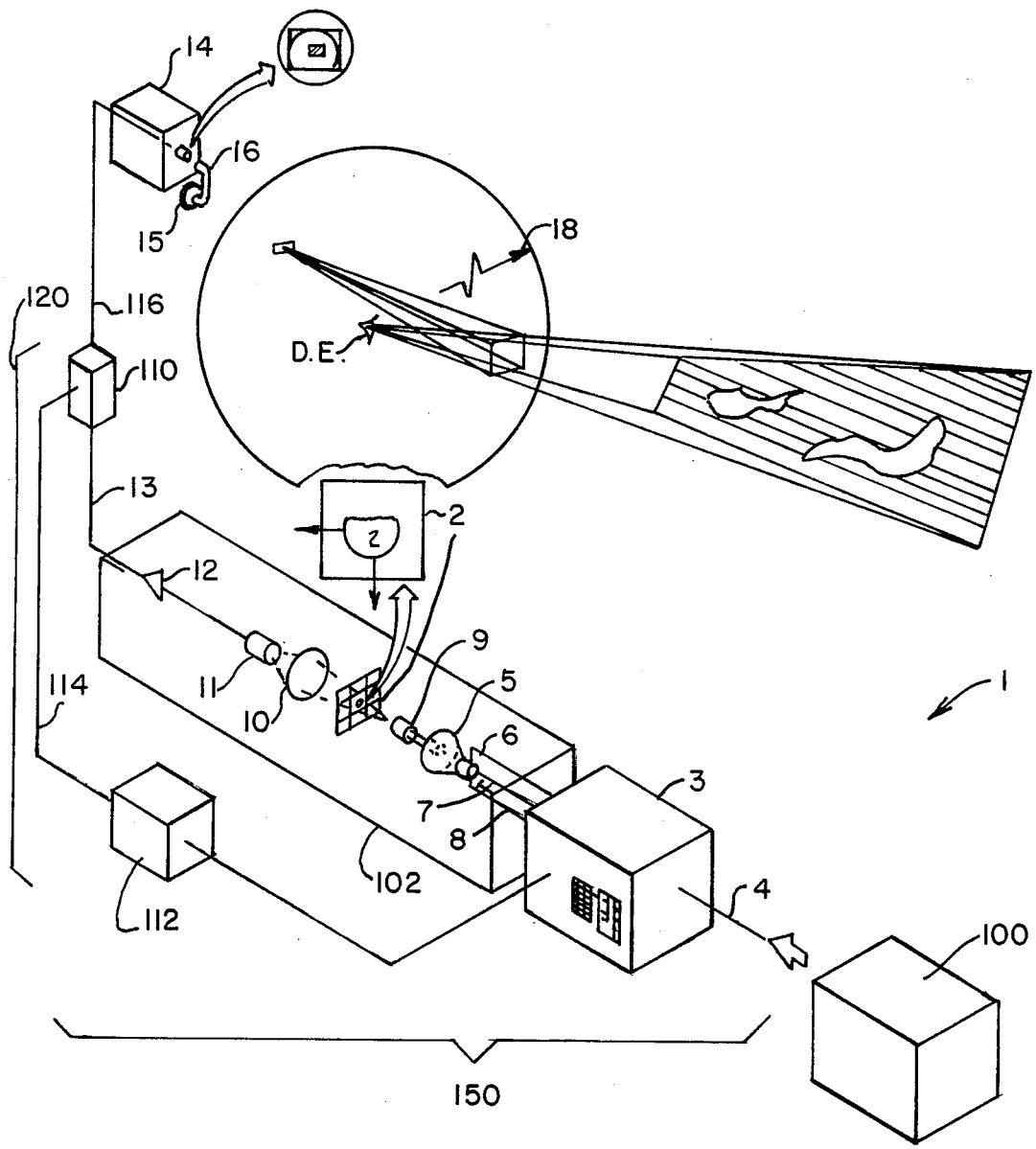
FIG. 1 is a diagrammatic view of one illustrative embodiment of the simulation system of this invention.

Referring now to FIG. 1, reference numeral 1 indicates a simulator training system shown in conceptual diagram form with which our invention finds application. The simulator system shown in FIG. 1 is based upon the use of a flying spot scanner means 102 traversing a flat earth image to develop a wide angle dome projection from the flat earth image. The approach is based upon the ability of the flying spot scanner means 102 to transform an element of imagery from a flat terrain map transparency 2 to its correct geometric position in the display field of view of the projection system.

As shown in FIG. 1, an image generation system 150 includes a raster generator 3, the flying spot scanner 102, a special effects generator 112, and a video mixer 110. The raster generator 3 has an input 4 which is, in the embodiment illustrated, obtained from a computer 100. The computer 100 generates inputs regarding altitude, attitude and vehicle position with respect to the terrain map transparency 2. The raster generator 3 controls a CRT 5 of the scanner means 102 through suitable outputs 6, 7 and 8. The raster image is projected through the terrain map transparency 2 by a relay lens 9. The raster image is modulated by or superimposed on the transparency and the resulting image is transmitted through a fresnel lens 10 and reconverted to an electrical signal at a transmitter 11. The electrical signal is amplified by an amplifier 12, an output 13 of which forms an input to the video mixer 110. The video mixer 110 also is supplied additional electrical signals from a special effects generator 112 that is operatively connected to the mixer 110 by a conductor 114. The special effects generator 112 is used to introduce sky, a haze band, clouds, and other enhancement into the scene that is created at the scanner means 102. An output 116 of the mixer 110 is the video input to a light valve projector 14. The light valve projector 14 converts the transmitted electrical signals back to an optical signal which is projected against a spherical mirror 15 through a suitable interconnection device 16. The resulting image is then projected onto a dome shaped projection area 18.

Figure 2:
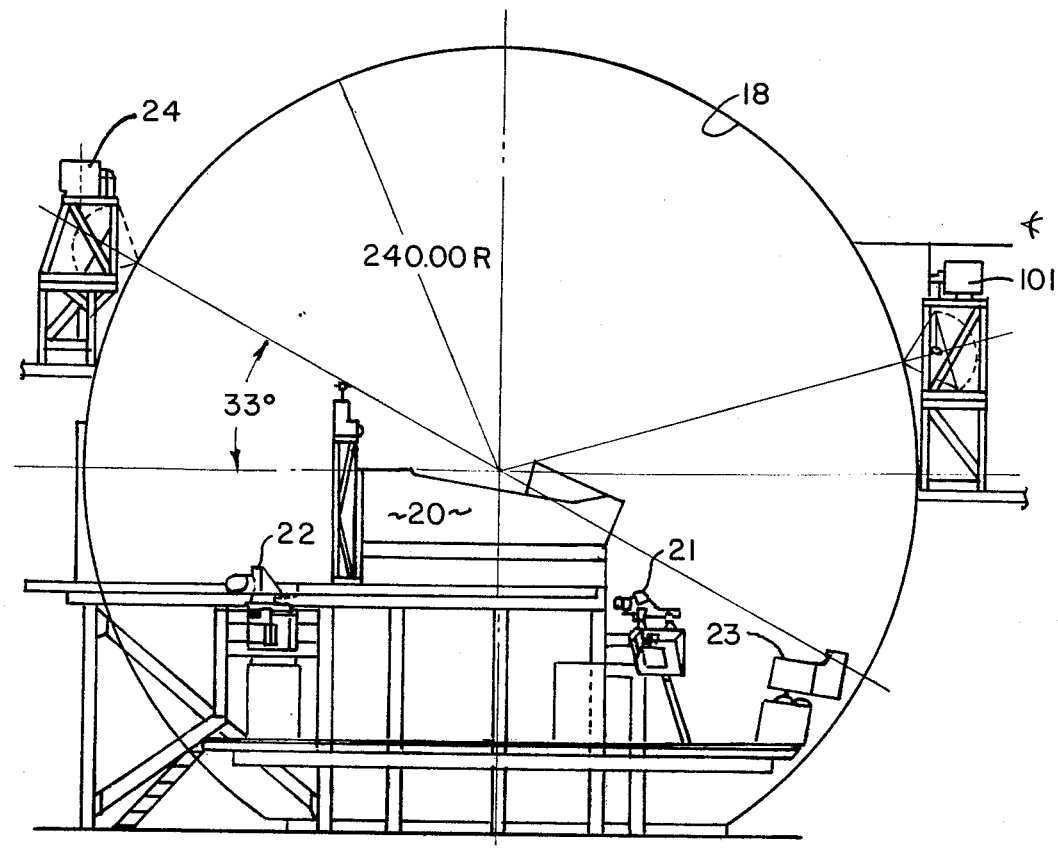
FIG. 2 is a diagrammatic view, partly in section, of a full field of view projection system employing the simulation system of FIG. 1.

FIG. 2 is a more detailed view of one illustrative embodiment of a flight simulator employing the image generation system 150 shown in FIG. 1. As shown in FIG. 2, an operator station 20 is positioned so that the pilot's field of view exists about him in the dome or projection area 18. The actual simulator with which our invention finds application includes a plurality of target projectors 21 and 22 and the entire dome 18 is illuminated by forward and aft projectors 23 and 24, respectively. A third projector 101 can be employed to eliminate cockpit shadowing of the projected images in the aft portion of the dome 18, if desired. We have found that the two projectors 23 and 24 can be used without excessive shadowing of the projected images on the dome 18. In any event, each of the projectors 23 and 24 is operated from its own respective scanner means 102 in accordance with the diagrammatic view of FIG. 1.

Figure 6:
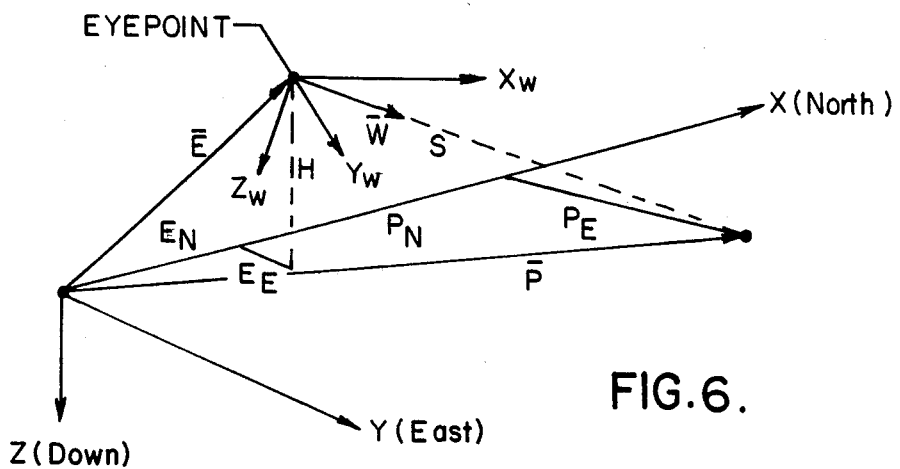
FIG. 6 is a vector diagram useful in demonstrating eyepoint/terrain geometry.

As shown in FIG. 6, the instantaneous line of sight unit vector can be mathematically extended from the design eye (designated D.E. in FIG. 1) to a point on the terrain which corresponds directly to a specific point in the scanner transparency 2. This unit vector can be expressed in window coordinates W (X,Y,Z) as a function of time within the raster scan period, based upon the display field of view and distortion characteristics. These components are rotated to local vertical (north, east, down orientation) coordinates U (N, E, D,) in the general matrix expression:

$$\begin{bmatrix} U_N \\ U_E \\ U_D \end{bmatrix} = \begin{bmatrix} T1\ (\theta, \psi) & T4\ (\theta, \phi, \psi) & T7\ (\theta, \phi, \psi) \\ T2\ (\theta, \psi) & T5\ (\theta, \phi, \psi) & T8\ (\theta, \phi, \psi) \\ T3\ (\theta) & T6\ (\theta, \phi) & T9\ (\theta, \phi) \end{bmatrix} \begin{bmatrix} W_X \\ W_Y \\ W_Z \end{bmatrix}$$

Matrix T ($\theta$, $\phi$, $\psi$) comprises the pitch, roll and yaw direction cosine transformations required to reorient the window coordinates. As shown in FIG. 6, the point of terrain intersection is equal to the eyepoint position E (N,E,D) plus product of slant range and local vertical unit vector:

$$[P\ (N,E,D)] = [E,\ (N,E,D)] + S\ [U\ (N,E,D)]$$

Assuming that the origin of the local vertical coordinate system is in the plane of the terrain ($P_D=0$), and that the Z component of eyepoint position is just minus the height above the terrain, $-H$ (since Z is defined positive downward), then:

$$P_N = E_N + S\ U_N$$

$$P_E = E_E + S\ U_E$$

$$0 = -H + S\ U_D$$

Solving the above equation for slant range gives:

$$S = H/U_D$$

Substituting slant range of the above into the previous equations:

$$P_N = E_N + H\ U_N/U_D$$

$$P_E = E_E + H\ U_E/U_D$$

As shown by the last two equations, the scanned shape on the CRT 5 expands about the eyepoint horizontal position as a linear function of altitude. The minimum altitude is, therefore, constrained by the minimum raster that can be scanned on the CRT 5 and the scale of the transparency 2. Also, at some minimum altitude, the flat earth fixed viewpoint transparency will yield unacceptably unrealistic scenes. A maximum of 10:1 has been selected for the ratio of radial terrain coverage to altitude. As indicated above, this is necessary to avoid division by zero in the above equation for areas near the horizon ($U_D=0$). A maximum terrain coverage of 100,000 feet radius corresponds to an altitude of 10,000 feet. This constraint places the edge of moving terrain at a fixed angle of $\tan^{-1}$ (10K/100K)=5.71 degrees below the horizon. Between the terrain edge and the horizon, a haze band is electronically inserted. The eyepoint position E (N,E,D) and orientation transformation T ($\theta$, $\phi$, $\psi$) components are changing slowly with respect to the unit vector window components W (X,Y,Z). The former may be supplied at the computer update rate whereas the latter are generated using high speed digital/analog generators synchronized to the CRT 5 and light value projector 14.

Figure 5:
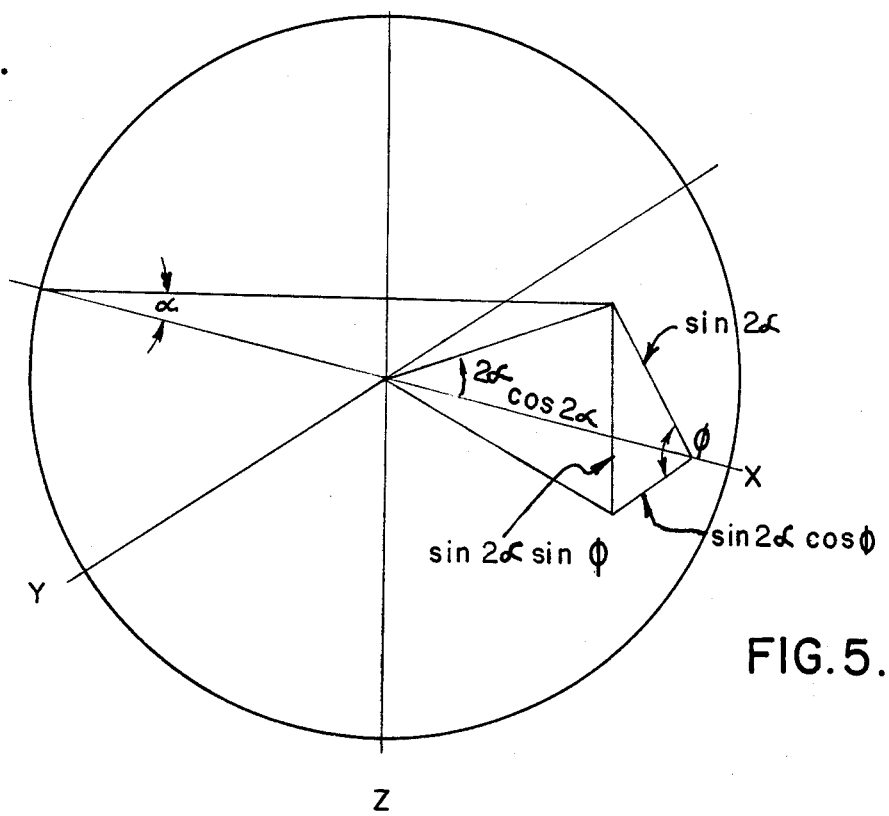
FIG. 5 is a representation of a projected image, useful in defining terms.

In order to control the sweep of the CRT 5, sweep signals are generated to shape the rasters and to give the proper projection on the dome 18. FIG. 5 is a representation of that projection, which defines terms. The center of the circle shown in FIG. 5 corresponds to the design eye or observer shown in FIG. 1 under the notation D.E. In defining terms, we have found that:

$$w_x = \cos 2\alpha$$
$$w_y = \sin 2\alpha \cos\phi$$
$$w_z = -\sin 2\alpha \sin\phi$$
$$\tan\alpha = (y^2 + z^2)^{\frac{1}{2}}$$

$$\tan\phi = \frac{-z}{y}$$

$$\sin\alpha = \frac{(y^2 + z^2)^{\frac{1}{2}}}{(1 + y^2 + z^2)^{\frac{1}{2}}}$$

$$\cos\alpha = \frac{1}{(1 + y^2 + z^2)^{\frac{1}{2}}}$$

$$\sin\phi = \frac{-z}{(y^2 + z^2)^{\frac{1}{2}}}$$

$$\cos\phi = \frac{y}{(y^2 + z^2)^{\frac{1}{2}}}$$

substituting terms $$w_x = \frac{1-(y^2+z^2)}{1+y^2+z^2}$$

$$w_y = \left[\frac{2(y^2+z^2)^{\frac{1}{2}}}{1+y^2+z^2}\right]\left[\frac{y}{(z^2+y^2)^{\frac{1}{2}}}\right] = \frac{2y}{1+y^2+z^2}$$

$$w_z = \left[\frac{-2(y^2+z^2)^{\frac{1}{2}}}{1+y^2+z^2}\right]\left[\frac{-z}{(z^2+y^2)^{\frac{1}{2}}}\right] = \frac{2z}{1+y^2+z^2}$$

These mathematical functions are derived in the raster generator 3.

FIGS. 3 and 4 are block diagrammatic views of the system employed in defining a point on the dome 18 projected from the transparency 2.

The vertical and horizontal positions in the projector raster correspond to the z and y terms, respectively, and are obtained from a corresponding sweep generator 30 and a sweep generator 31 shown in FIG. 3. The output of the sweep generator 30 is an input to an integrating amplifier 29 which yields the $y^2$ term at an output side 32. The output of sweep generator 31 is an input to a integrating amplifier 33, the term $z^2$ appearing at the output side 34 of the amplifier 33. The outputs 32 and 34 are respective inputs to a summing amplifier 35 which has a third input 36. The input 36 is a dc bias voltage which is set to a proper value to yield the term $1-y^2-z^2$ at an output side 37 of the amplifier 35.

The term $1-y^2-z^2$, in its electrical signal form, is an input to multiplying digital to analog converters (MDACs) 1', 3' and 2' of a board 40. The 2y output of the sweep generators 30 is an input at multiplying digital to analog converters (MDACs) 4', 6' and 5', while the 2z output of the sweep generator 31 is an input to the MDACs 7', 9' and 8'. As shown in FIG. 4, the output sides of the MDACs 1', 4' and 7' are inputs to the summing amplifier 41. The outputs of the MDACs 3', 6' and 9' are inputs to the summing amplifier 42, while the outputs of the MDACs 2', 5' and 8' are inputs to a summing amplifier 43.

An output side 44 of the amplifier 41 is an input to a divider 45. An output 46 of the divider 45 is an input to a squaring means 47 and to a multiplying DAC 61. An output 48 of the squaring means 47 is an input to a summing amplifier 49. A second input 50 of the summing amplifier 49 is an output of a squaring means 51. Amplifier 49 has an output 71 which provides a control voltage for the CRT 5. Squaring means 51 has an input 52 taken from an output 53 of a dividing means 54. An input 55 of the divider 54 is operatively connected to the output side of the amplifier 43. The output 53 of the dividing means 54 also is an input to a multiplying DAC 62.

Amplifier 42 has an output side 56 forming an input to dividers 45 and 54.

Altitude information from the computer 100 is an input at 60 to the pair of multiplying DAC's 61 and 62, respectively. The multiplying means 61 has an output 63 forming an input to a summing amplifier 64. A second input 65 to the summing amplifier 64 is the x position of the observer at the design eye. The input 65 is provided by the computer 100 and is defined as the integral of $\int x + IC_x$, where $IC_x$ is the initial x- condition or initial x- sweep position. An output 66 of the summing amplifier 64 is the x axis sweep voltage applied to the CRT 5.

An output 67 of the multiplying DAC 62 is an input to a summing amplifier 68. A second input 69 of the summing amplifier 68 is the y position of the observer as provided by the computer 100, expressed as the integral of $\int y + IC_y$. An output 70 of the summing amplifier 68 is the y axis sweep voltage applied to the CRT 5.

The special effects generator 112 and video mixer 110 comprise an earth-haze-sky (EHS) video processor 120 which implements two analog functions, $\tan^2\beta$ and $U_D$, provided by the raster generator 3, to define the EHS demarcation boundary. The angle $\beta$ is measured from the nadir to the instantaneous line of sight toward the horizon and is computed in the raster generator 3 as $\tan^2\beta = (U_N/U_D)_2 + (U_E/U_D)_2$, which is output 71 of amplifier 49, where $U_N$, $U_E$, and $U_D$ are north, east and down components of the local vertical coordinate unit vector U (N,E,D). The analog function $\tan^2\beta$ approximates atmospheric attenuation and is used to blend earth video into the horizon haze.

Figure 7:
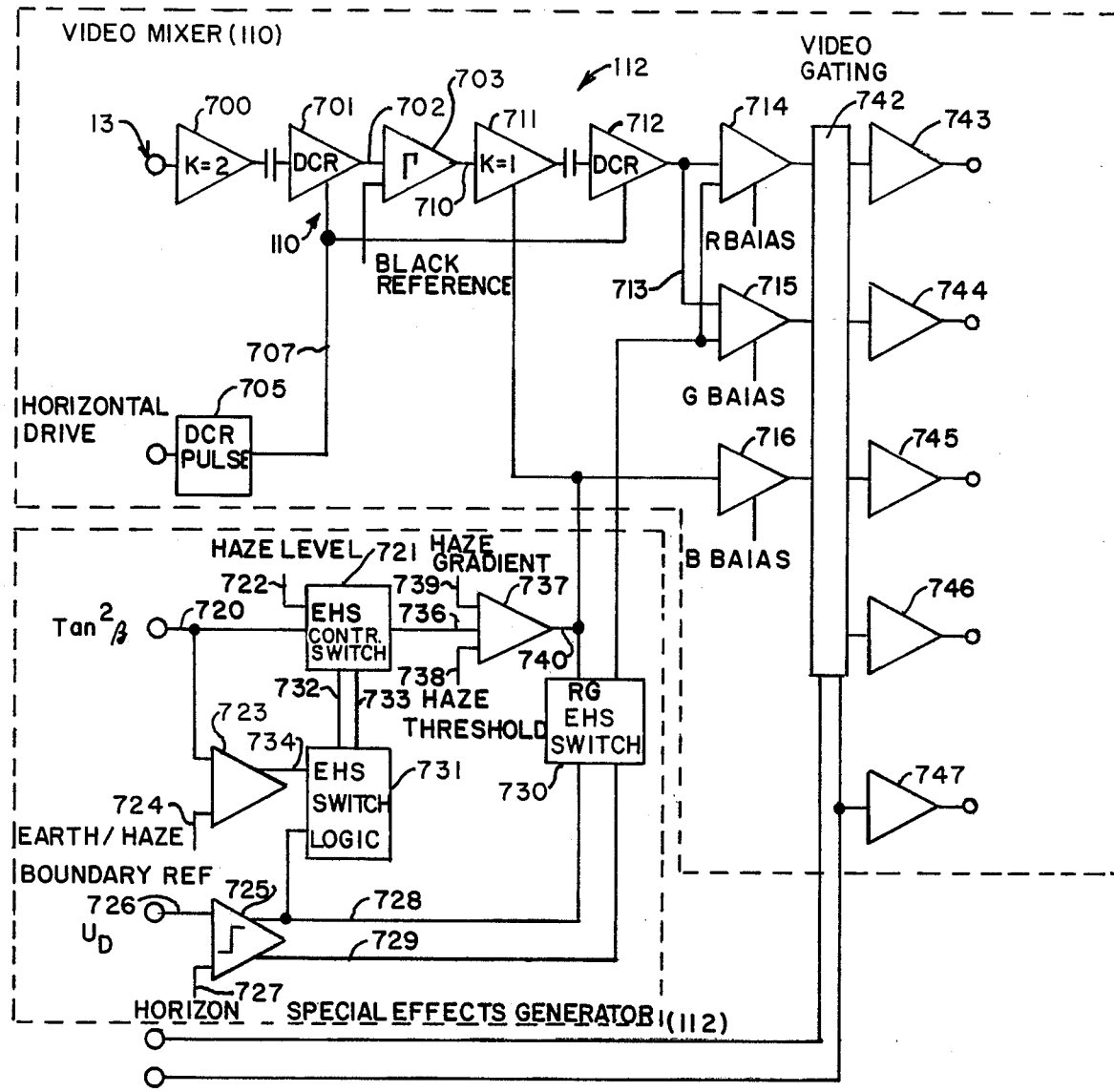
FIG. 7 is a block diagrammatic view illustrating the implementation of a haze band along the earth/sky boundary.

The enhancement feature just described is accomplished in the special effects generator 112. As shown in FIGS. 1 and 7, the output 13 of the flying spot scanner 102 is an input to the video mixer 110. The video signal 13 is amplified in video amplifier 700. The video mixer 110 includes a dc restorer 701 having an output side 702 connected to a amplifier 703.

The dc restorer 701 receives a reference pulse from a dc restorer pulse generator 705 along an input 707. The amplifier 703 establishes the black reference voltage for the video and has an output side 710 operatively connected to an amplifier 711. The amplifier 711 is operatively connected to a dc restorer 712 having an output 713 connected to an amplifier 714 and an amplifier 715, in the red and green video channels, respectively.

An earth haze sky (EHS) switch control means 721 has a $\tan^2\beta$ input 720 and a haze level input 722. The input 720 also forms an input to a comparator 723. The comparator 723 also has a second input 724. The input 724 establishes an earth/haze boundary reference input for the comparator 723.

A comparator 725 has an input 726 and a reference input 727. Comparator 725 establishes the horizon reference for the system. The comparator 725 has a first output 728 and a second output 729. The outputs 728 and 729 of comparator 725 are inputs to a red/green earth/haze/sky switch 730. The output 728 also is an input to a earth/haze/sky switch logic means 731. The logic means 731 also receives an input 734 from the comparator 723. The earth/haze/sky logic means 731 provides logic control for the earth/haze/sky control switch means 721 along outputs 732 and 733.

The EHS switch control means 721 has an output 736 operatively connected to a amplifier 737. The amplifier 737 also has a haze threshold input 738, and a haze gradient input, which may be an analog ramp voltage, provided to it at an input 739. An output side 740 of the amplifier 737 is utilized to control the red, green and blue video channels during the haze period of operation.

The output sides of the amplifiers 714, 715 and 716 pass through a suitable video gating means 742 to respective amplifiers 743, 744 and 745. The block diagram of FIG. 7 also includes a composite video amplifier 746 and a synchronization amplifier 747. The amplifier 746 is used for system set up, and the sync signal is an optional circuit not employed in the preferred embodiment of our invention.

The edge of active earth imagery, or earth/haze boundary, is determined by the formula $\beta$max=-

$\tan^{-1}(100K/10K) = 84.29°$. The computations of $U_N/U_D$ and $U_E/U_D$ are limited at $\beta_{max}$ to accommodate the available dynamic range of the analog dividers. This results in distortion of the imagery scanned beyond the active earth limit, i.e., during the haze band. Partially obscuring the resulting distorted haze band video with a dc haze level achieves the visual effect of blending the earth imagery into indistinct haze just below and extending to the horizon. This creates the illusion of the existence of terrain imagery beyond the $\beta_{max}$ angular limit, although obscured by the atmospheric horizon haze band.

The function $U_D$ is the denominator term in the north, east, down coordinate transformation equations implemented in the raster generator 3 dividers, and the zero crossing of $U_D$ defines the true horizon position. The $\tan^2\beta$ and $U_D$ signals are compared to preset references in high speed comparators to define angular switching points for selection of the $\tan^2\beta$ function or dc reference levels. This achieves simultaneous fading of earth video and mixing of haze level and specifies the horizon location as implemented in the functional block diagram of FIG. 7.

The $\tan^2\beta$ is thus modified and used as an EHS control signal to modulate scene video and provide a haze characteristic. The control signal attenuates the gain of a gate-controlled video amplifier to reduce video contrast and amplitude toward the horizon. This faded video is then summed with the $\tan^2\beta$ analog haze signal to achieve an average visibility gray level blending into a solid haze level beyond the active $\tan^2\beta$ limit or "earth/haze boundary". The discrete sky/haze boundary is defined by the $U_D$ zero crossing or "horizon".

Numerous variations, within the scope of the appended claims, will be apparent to those skilled in the art in light of the foregoing description and accompanying drawings. Thus, while certain values and limits were described as preferred, other limits or designs may be employed, if desired. Likewise, while single line representations were shown in the diagrammatic views embodying various embodiments, those skilled in the art wll recognize that the single conductors represent multiple conductors in embodiments of this invention. We find a dome projection area preferable, although other projection areas can be used. It will be appreciated that the transparency 2 can be changed easily, so that the scene provided to an observer can be altered to suit particular situations. These variations are merely illustrative.

Having thus described the invention, what is claimed and desired to be secured by Letters Patent is:

1. A system for generating an image to be projected on a curved projection surface area, comprising:
   raster generating means for developing control voltages for a cathode ray tube, including means for achieveing a geometric transform of images from a flat transparency to said curved projection area, said raster generating means including combining means having a plurality of inputs and an output operatively connected to a plurality of multiplying digital-to-analog converters; a first sweep generator operatively connected to said combining means at one of said inputs and to at least one multiplying digital-to-analog converters; a second sweep generator operatively connected to said combining means along one of said inputs and to at least one of said multiplying digital-to-analog converters; a plurality of multiplying digital-to-analog converters operatively connected to said first sweep generator and to said second sweep generator; means on the output side of said multiplying digital-to-analog converters for generating control voltages to a cathode ray tube based on a position with respect to said image of an observer of said image;
   flying spot scanner means including said cathode ray tube operatively connected to said raster generator means, a transparency aligned with said cathode ray tube, and means for superimposing the cathode ray tube image over said transparency for providing a first video signal, said transparency being a representation of a real world scene and being removably mounted in said flying spot scanner means to permit easy change of the projected scene;
   special effects generating means operatively connected to said raster generating means for providing a second video signal, said special effects generating means comprising means for generating a video signal for presenting a haze band at the earth/sky interface of said projected scene;
   means for combining the first and second video signals; and
   means for projecting said combined video signal on said projection area.

2. The system of claim 1 wherein said projection means projects an image on two pi steradians of a sphere.

3. The system of claim 2 wherein said special effects generator includes means for generating a color video electrical signal for combination with the signal of said flying spot scanner means.

4. The system of claim 3 wherein said special effects generator includes means for establishing the crossing of a horizon with respect to the transparency of said flying spot scanner means.

5. A system for generating an image, comprising:
   a projection surface area, said projection surface area comprising a curved surface;
   an observer station positioned to permit observation of said projection surface area;
   raster generating means for developing control voltages for a cathode ray tube (CRT) including means for achieving a geometric transform of images from a flat transparency to said curved projection area, said raster generator means including combining means having a plurality of inputs and at least one output operatively connected to a plurality of multiplying digital-to-analog converters, first sweep generating means connected to said combining means along one of said inputs, and to at least one multiplying digital-to-analog converter; second sweep generating means operatively connected to said combining means along one of said inputs and to at least one of said multiplying digital-to-analog converters; and means on the output side of said multiplying digital-to-analog converters for generating control voltages to said CRT based on the position with respect to said image of an observer of said image;
   flying spot scanner means including a video image generating device connected to said raster generating means;
   a transparency, said transparency being a representation of a real world scene, and being removably mounted in said flying spot scanner to permit easy change of the projected real world scene 1, and means for superimposing the video image over said transparency for providing a first video signal special effects generating means operatively connected to said raster generating means for providing a second video signal, said special effects generating means comprising means for generating a video signal for presenting a haze band along the earth/sky interface of the projected scene;

means for combining the first and second signals; and means for projecting said combined video signal on said projection area.

6. The system of claim 5 wherein said special effects generator includes means for generating a color video electrical signal for combining with the video signal of said flying spot scanner means.

7. The system of claim 6 wherein said special effects generator includes means for establishing the crossing of a horizon with respect to the transparency of the flying spot scanner.

8. The system of claim 7 wherein said projection area is spherical.

9. A system for generating an image, comprising:

a projection surface area, said projection surface area being spherical in design;

an observer station positioned to observe said projection surface area;

raster generating means for developing control voltage for an electronic image device, said raster generating means including means for achieving a geometric transform of images from a flat transparency to said curved projection area, combining means having a plurality of inputs and an output operatively connected to a plurality of multiplying digital-to-analog converters;

first sweep generating means operatively connected to said combining means along one of said inputs, and to at least one of said multiplying digital-to-analog converters; second sweep generating means operatively connected to said combining means along one of said inputs and to at least one of said multiplying digital-to-analog converters; and means on the output side of said multiplying digital-to-analog converters for generating control voltages for said electronic image generating means based on the position with respect to said image of an observer of said image;

flying spot scanner means including said electronic image device operatively connected to said raster generating means, said electronic image generating means comprising a cathode ray tube light source, a transparency, said transparency being a representation of a real world scene, said transparency being removably mounted in said flying spot scanner to permit easy change of the real world scene, and means for transferring the electronic image generating device image through said transparency for providing a video signal;

special effects generating means operatively connected to said raster generating means for providing a second video signal, said special effects generating means including means for generating a video signal for presenting a haze band along an earth/sky interface of the projected scene;

means for combining said first and second signals; and means for projecting said combined signals along said projection area.

10. The system of claim 9 wherein said electronic image generating means comprises a cathode ray tube light source.

11. The system of claim 10 wherein said projection surface area is spherical.

12. The system of claim 11 wherein said transparency is a representation of a real world scene.

13. The system of claim 12 wherein said transparency is removably mounted in said flying spot scanner to permit easy change of the real world scene.

14. A system for generating an image, comprising:

a projection surface area;

raster generating means for developing control voltage for an electronic image device, said raster generating means including a combining means having a plurality of inputs and at least one output operatively connected to a plurality of multiplying digital-to-analog converters; first sweep generating means operatively connected to said combining means along one of said inputs, and to at least one of said multiplying digital-to-analog converters; second sweep generating means operatively connected to said combining means along one of said inputs and to at least one of said multiplying digital-to-analog converters; and means on the output side of said multiplying digital-to-analog converters for generating control voltages for said electronic image device based on the position with respect to said image of an observer of said image;

flying spot scanning means including said electronic image device operatively connected to said raster generating means, a transparency, and means for transferring the electronic image generating device image through said transparency for providing a first video signal;

special effects generating means operatively connected to said raster generating means for providing a second video signal;

means for combining said first and said second video signals; and means for projecting said combined signals along said projection area.

15. The system of claim 14 wherein said special effects generator includes means for generating a color video electrical signal for combination with the signal of said flying spot scanner means.

16. The system of claim 15 wherein said projection means projects an image on two pi steradians of a sphere.

17. The system of claim 16 wherein said special effects generating means includes means for establishing the crossing of a horizon with respect to the transparency of said flying spot scanner means.

* * * * *

UNITED STATES PATENT AND TRADEMARK OFFICE
CERTIFICATE OF CORRECTION

PATENT NO. : 4,599,645
DATED : July 8, 1986
INVENTOR(S) : Raymond E. Brown et al It is certified that error appears in the above-identified patent and that said Letters Patent is hereby corrected as shown below:

Abstract, line 10, "cures" should be "cues".

Column 5, line 64, "$\int x$" should be "$\int \dot{x}$".

Column 6, line 3, "$\int y$" should be "$\int \dot{y}$"; line 32, "713" should be "side 713".

Column 7, line 24, "$\tan^2 \beta$ is" should be "$\tan^2 \beta$ function is".

Signed and Sealed this

Tenth Day of February, 1987

Attest:

DONALD J. QUIGG

Attesting Officer

Commissioner of Patents and Trademarks